(12) United States Patent
Dafali

(10) Patent No.: US 11,930,098 B2
(45) Date of Patent: Mar. 12, 2024

(54) DEVICES AND METHODS FOR THE DETECTION AND LOCALIZATION OF FAULT INJECTION ATTACKS

(71) Applicant: SECURE-IC SAS, Cesson-Sevigne (FR)

(72) Inventor: Rachid Dafali, Chartres-de-Bretagne (FR)

(73) Assignee: SECURE-IC SAS, Cesson-Sevigne (FR)

(*) Notice: Subject to any disclaimer, the term of this patent is extended or adjusted under 35 U.S.C. 154(b) by 460 days.

(21) Appl. No.: 17/311,670

(22) PCT Filed: Dec. 20, 2019

(86) PCT No.: PCT/EP2019/086519
§ 371 (c)(1),
(2) Date: Jun. 7, 2021

(87) PCT Pub. No.: WO2020/127869
PCT Pub. Date: Jun. 25, 2020

(65) Prior Publication Data
US 2022/0029780 A1    Jan. 27, 2022

(30) Foreign Application Priority Data
Dec. 20, 2018 (EP) ..................... 18306753

(51) Int. Cl.
*H04L 9/40* (2022.01)
*G06F 7/58* (2006.01)
*H04L 9/00* (2022.01)

(52) U.S. Cl.
CPC ............. *H04L 9/004* (2013.01); *G06F 7/588* (2013.01); *H04L 63/1466* (2013.01); *H04L 2209/12* (2013.01)

(58) Field of Classification Search
CPC . H04L 9/004; H04L 63/1466; H04L 2209/12; G06F 7/588
See application file for complete search history.

(56) References Cited

U.S. PATENT DOCUMENTS

| 7,502,815 B1* | 3/2009 | Drimer ................... G06F 7/588 |
| | | 708/250 |
| 10,733,291 B1* | 8/2020 | McLeod ............. G06F 11/3058 |

(Continued)

FOREIGN PATENT DOCUMENTS

CN     103 645 421 A    3/2014

OTHER PUBLICATIONS

Poucheret, et al., "Injection directe de puissance par medium EM", LORMM, ST, and CEA, 2010.
(Continued)

*Primary Examiner* — Ponnoreay Pich
*Assistant Examiner* — Mudasiru K Olaegbe
(74) *Attorney, Agent, or Firm* — BakerHostetler

(57) ABSTRACT

A device for detecting perturbation attacks performed on a digital circuit is provided. The device comprises: a first metallic layer and a second metallic layer arranged on the digital circuit, the first metal layer comprising a plurality of signal transmission lines routed horizontally, the second metal layer comprising a plurality of signal transmission lines routed vertically, the device comprising one or more transmitter buffers and one or more receiver buffers, a transmitter buffer and a receiver buffer being connected by each signal transmission line; a random number generator configured to generate random signal values; the device further comprising a transmitter manager connected to one or more transmitter buffers and a receiver manager connected to one or more receiver buffers, wherein: the transmitter manager is configured to transmit random signal (Continued)

values generated by the random number generator over the signal transmission lines of the first metallic layer and the second metallic layer, the receiver manager is configured to receive random signal values from the transmitter manager through the one or more receiver buffers connected to the receiver manager, measure a transmission time corresponding to a time of transmission of the received random signal values, and compare the transmission time to a predefined timing interval to detect perturbation attacks.

15 Claims, 2 Drawing Sheets

(56) References Cited

U.S. PATENT DOCUMENTS

| | | | |
|---|---|---|---|
| 11,468,314 B1* | 10/2022 | Singh | G06N 3/048 |
| 2012/0240088 A1* | 9/2012 | Guo | G06F 30/39 |
| | | | 716/104 |
| 2018/0285483 A1* | 10/2018 | Guilley | G01R 31/318314 |
| 2019/0372751 A1* | 12/2019 | Yanamadala | H04L 9/004 |
| 2020/0212943 A1* | 7/2020 | Banin | H04L 7/0331 |

OTHER PUBLICATIONS

Quisquater, et al., "Eddy current for magnetic analysis with active sensor", Proceedings of Esmart 2002, pp. 185-193, 2002.
Ryan, "Bridging fault simulation using Iddq, logic, and delay testing", Conference Record Autotestcon '95. Systems Readiness: Test Technology for the 21st Century, pp. 176-180, 1995.
Poucheret, "Injection electromagnetiques: developpement d'outils et methodes pour la realisation d'attaques materielles, Universite Montpellier II, Sciences et Techniques du Languedoc, These, 2012".
Moro, "Securisation de programmes assembleur face aux attaques visant les processeurs embarques", Theses, Computer Science (cs)/ Cryptography and Security, CEA, 2014.
Schmidt, et al., "Optical and em fault-attacks on crt-based rsa: Concrete results", Austrochip 2007, 15th Austrian Workhop on Microelectronics, Institute for Applied Information Processing and Communciations (IAIK), pp. 61-67, Oct. 11, 2007.
Ordas, et al., "Electromagnetic Fault Injection: the curse of flip-flops", Journal of Cryptographic Engineering, vol. 7, No. 3, pp. 1-15, 2017.

* cited by examiner

DEVICES AND METHODS FOR THE DETECTION AND LOCALIZATION OF FAULT INJECTION ATTACKS

CROSS-REFERENCE TO RELATED APPLICATIONS

This application is a National Stage of International patent application PCT/EP2019/086519, filed on Dec. 20, 2019, which claims priority to foreign European patent application No. EP 18306753.7, filed on Dec. 20, 2018, the disclosures of which are incorporated by reference in their entirety.

TECHNICAL FIELD

The invention generally relates to digital electronics, and in particular to the detection and localization of fault injection attacks performed on digital circuits.

BACKGROUND

Digital electronics is used to design digital devices in various systems such as industrial systems, communication systems, computing systems, or security systems. Examples of digital devices comprise computers, smart-phones, tablets, embedded systems, smart devices (e.g. smart cards, tags, Internet of Thing sensors and devices), storage device (e.g. USB sticks and hard-drives), and security devices. Digital devices based on digital circuitry are becoming essential items in several applications such as in aerospace, automotive, energy, health care, and transportation fields.

Digital storage, communication, or computing devices handle digital information in the form of discrete bands of analog levels, and are controlled by control means which use Boolean logic. The hardware part of digital devices generally comprises digital circuits, integrated circuits, and logic gates that operate on digital signals.

Information stored, transmitted, or computed in a digital device can comprise sensitive or secret data that requires high security and protection levels against attackers or eavesdroppers who aim to recover secret data during its storage, transmission, or computation. For example, modern digital devices implement cryptographic mechanisms that aim at protecting and securing handled data. Such cryptographic devices use secret values such as cryptographic keys to generate encrypted data from original data for preventing an attacker from recovering the original data. Attackers can seek for learning secret values such as the cryptographic keys or for exploiting information leaking from the attacked device without learning secret values for damaging the normal serviceability of the device/system. An attack on the cryptographic device can have disastrous implications on data security including, for example, loss of privacy and loss of protection.

Several attacks exist comprising cyber attacks and hardware/physical attacks. Cyber attacks target the behavior of the attacked device when executing a software code or a program. Hardware attacks target the physical implementation of cryptographic mechanisms and algorithms.

Physical attacks can be categorized into side-channel attacks, also called 'observation attacks', and fault injection attacks, also called 'perturbation attacks'.

Side-channel attacks use any physically leaked information (e.g. power consumption, processing time, electromagnetic radiations, sound and infrared radiations) leaking from the attacked device as an additional source of knowledge of the physical implementation of cryptographic mechanisms and algorithms. Leaked information can reveal characteristics on the internal structure of the attacked device and on the running cryptographic mechanisms. For example, measuring power consumption of a cryptographic device over time or measuring the time required to run cryptographic functions might disclose information about the cryptographic keys used by the cryptographic functions.

The aim of fault injection attacks is to alter the correct functioning of the system/device from outside by forcing the attacked device to perform erroneous operations with the purpose of exploiting leaked information during the wrong behavior of the attacked device to determine secret parameters/values involved during the running of the erroneous operations.

Fault injection attacks can induce a data modification (e.g. a modification of a value in a register, a modification of a value in the memory hierarchy, a modification of a data or a code), and/or a modification of a control signal (e.g. status flag, branch direction), and/or a flow modification (e.g. a skip or a modification of the instructions), and/or a delay or an advance propagation of the internal control signals.

Fault models comprise single/multiple bit-flips (i.e. a target variable was altered by single or multiple bit flips), random byte fault (i.e. non-precise multi-bit flip resulting in that some bits of a byte are flipped), instruction skip (i.e. one or several instructions were not executed), and stuck at fault (i.e. a target variable is stuck at bit 0 or 1).

Several techniques for inducing fault injection attacks exist comprising:
power glitch by performing a perturbation in the power supply voltage;
clock tampering by disturbing the clock;
temperature variation by over or under heating the chip;
light/laser injection by exposing the chip to intense lights or beams;
radiation or electromagnetic (EM) injection by using high energy electromagnetic field to induce faults.

EM Injection is used to introduce a fault by generating a bit flip in a chip (transistors and memory cells) by placing the device in a high energy electromagnetic field as disclosed for example in:
"Poucheret F. Tobich K. Lisart M. Robisson B. Maurine P. Injection directe de puissance par medium em. LORMM, ST and CEA, 2010",
"Poucheret F. Injection electromagnetiques: developpement d outils et methodes pour la realisation d attaques materielles. Universite Montpellier 2, 2012", and
"Moro N. Securisation de programmes assembleur face aux attaques visant les processeurs embarques. CEA, 2014".

According to these approaches, the EM injection attack uses EM waves and semi-local effect to enable high penetration. EM injection attacks are difficult to detect and require low cost equipments and few boards to be achieved.

An EM injection introduced in "Jean-Jacques Quisquater and David Samyde. Eddy current for magnetic analysis with active sensor, In Proceedings of Esmart, volume 2002", is based on an external electromagnetic field injected on the surface of an integrated circuit to make a single bit fault. The injection produces a sudden and intense current flow in the power/ground network which leads to unauthorized phenomenon on high density very-large-scale integration as voltage drops and ground bounces. The EM injection forms a very powerful attack, as indicated in "Jörn-Marc Schmidt and Michael Hutter. Optical and em fault-attacks on crt-based rsa: Concrete results. na, 2007", because the faults are injected through the package without costly operations like integrated chip decapsulation.

Further, as disclosed in "Sébastien Ordas, Ludovic Guillaume-Sage, and Philippe Maurine. Electromagnetic Fault Injection: the curse of flip-flops. Journal of Cryptographic Engineering, pages 1-15, 2016", EM injection follows the sampling fault model rather than the timing fault model, EM injection does not impact the path delay (timing model) because the effect of the EM is not linked to the clock signal.

A fault detection approach or a fault prevention approach can be used for protecting devices against fault injection attacks.

Fault detection techniques comprise the detection of injection attempts, the detection of digital data modifications, and the performance of sanity checks on physical parameters. Fault detection techniques can use for example:
- a sensor/detector capable of sensing any physical disturbance, or
- an analog glitch detector for checking voltage range and clock frequency capable of triggering recovery in case of out of range operation, or
- an integrated laser detector to detect laser beams.

Fault prevention techniques enable correcting or infecting a fault. Countermeasures for preventing attacks can embed additional protection blocks and modify the original circuit into a secured circuit. Fault prevention techniques can for example:
- use electrical shielding;
- use uniform computation durations and power consumption operations;
- use detection/correction codes;
- provide a random behavior;
- add noise (e.g. using masking, useless instructions/computations), or
- perform a circuit reconfiguration (e.g. reconfiguration of the algorithms or the representation of values).

Existing approaches used for the prevention and the detection of fault injection attacks are suboptimal in the sense that they do not provide a full protection of the digital circuit against perturbation attacks and do not provide efficient real-time detection and localization of the perturbations performed on the device.

There is accordingly a need for efficient, real-time, and easy-to-implement devices and method for detecting and localizing fault injection attacks.

SUMMARY

In order to address these and other problems, there is provided a device for detecting perturbation attacks performed on a digital circuit. The device comprises:
- a first metallic layer and a second metallic layer arranged on the digital circuit, the first metal layer comprising a plurality of signal transmission lines routed horizontally, the second metal layer comprising a plurality of signal transmission lines routed vertically, the device comprising one or more transmitter buffers and one or more receiver buffers, a transmitter buffer and a receiver buffer being connected by each signal transmission line;
- a random number generator configured to generate random signal values, the device further comprising a transmitter manager connected to one or more transmitter buffers and a receiver manager connected to one or more receiver buffers. The transmitter manager may be configured to transmit random signal values generated by the random number generator over the signal transmission lines of the first metallic layer and the second metallic layer, the random signal values being transmitted from the one or more transmitter buffers, connected to the transmitter manager, to the one or more receiver buffers connected to the receiver manager. The receiver manager may be configured to receive random signal values from the transmitter manager through the one or more receiver buffers connected to the receiver manager, measure a transmission time corresponding to a time of transmission of the received random signal values, and compare the transmission time to a predefined timing interval to detect perturbation attacks.

According to some embodiments, the device may be further configured to localize a detected perturbation attack from the comparison between the transmission time and the predefined timing interval.

According to some embodiments, the predefined timing interval may be related to the number of system clock cycles needed to transmit the random signal values through each signal transmission line.

According to some embodiments, the predefined timing interval may be represented by a first threshold corresponding to a minimum timing value and a second threshold corresponding to a maximum timing value, the first and second thresholds being determined depending on one or more parameters in the group consisting of a length of the signal transmission lines comprised in the first metallic layer and in the second metallic layer, a temperature, a voltage, and a load of a power supply charging the digital circuit.

According to some embodiments, the receiver manager may be configured to compare the transmission time to the first threshold and to the second threshold, the receiver manager detecting a perturbation attack if the measured transmission time is lower than the first threshold or if the measured transmission time is higher than the second threshold.

According to some embodiments, the random number generator may be configured to update the random signal values at each rising edge of a system clock, the transmitter manager being configured to transmit updated random signal values at each rising edge of the system clock.

According to some embodiments, the receiver manager may use an internal clock with a frequency higher than the frequency of the system clock, a timing interval represented by a first threshold and a second threshold being defined by the number of internal clock cycles needed to transmit the random signal values through the signal transmission lines.

According to some embodiments, the receiver manager may be configured to:
- receive and store the updated random signal values during each rising edge of the system clock and to initialize a counter at each rising edge of the system clock;
- increment the counter at each rising edge of the internal clock;
- compare, at each clock cycle of the internal clock, the counter to the first threshold and the second threshold;
- read, at each rising edge of said internal clock, random signal values transmitted through the signal transmission lines;
- compare, at each rising edge of the internal clock, random signal values transmitted through signal transmission lines to stored updated random signal values; and
- compare, at each rising edge of the internal clock, random signal values transmitted through the signal transmission lines during a current system clock cycle to random signal values transmitted through the signal transmission lines during the precedent system clock cycle.

According to some embodiments, the receiver manager may be configured to raise an alarm:
- if the counter is equal to the second threshold and the random signal values transmitted through the signal transmission lines are different from the updated random signal values stored during the rising edge of system clock, or
- if the counter is lower than the first threshold and the random signal values transmitted through the signal transmission lines during a current system clock cycle are different from the random signal values transmitted through the signal transmission lines during the preceding system clock cycle, or
- if the counter is higher than the second threshold and the random signal values transmitted through the signal transmission lines during a current system clock cycle are different from the random signal values transmitted through the signal transmission lines during the preceding system clock cycle, or
- if the random signal values transmitted through the signal transmission lines change more than two times during one system clock cycle.

According to some embodiments, the receiver manager may be configured to determine localizations of one or more detected perturbation attacks using at least one signal transmission line routed horizontally and at least one signal transmission line routed vertically.

According to some embodiments, the perturbation attack may be one of a power glitch, a system clock tampering, a laser or light injection attack, or an electromagnetic injection attack.

According to some embodiments, the digital circuit may be a cryptographic digital circuit comprising at least a sub-circuit configured to perform one or more cryptographic operations chosen in a group comprising data and/or signal encryption and/or decryption, message authentication, and digital signatures.

According to some embodiments, data and/or signal encryption and/or decryption may implement one or more of error correcting codes, hash functions, and secret key-based encryption algorithms.

According to some embodiments, a secret key-based encryption algorithm may be a symmetric encryption algorithm chosen in a group comprising DES (Data Encryption Standard), 3DES, AES (Advanced Encryption Standard), and RC4 (Rivest Cipher 4).

According to some embodiments, a secret key-based encryption algorithm may be an asymmetric encryption algorithm chosen in a group comprising RSA (Rivest-Shamir-Adleman) and ECDSA (Elliptic Curve Digital Signature Algorithm).

There is also provided a method for detecting perturbation attacks performed on a digital circuit, the method comprising:
- arranging a first metallic layer and a second metallic layer on the digital circuit, the first metallic layer comprising a plurality of signal transmission lines routed horizontally, the second metallic layer comprising a plurality of signal transmission lines routed vertically, each signal transmission line connecting a transmitter buffer to a receiver buffer;
- generating random signal values;
- transmitting, by a transmitter manager, the random signal values over the signal transmission lines of the first metallic layer and the second metallic layer, the random signal values being transmitted from one or more transmitter buffers connected to the transmitter manager, to one or more receiver buffers connected to a receiver manager;
- receiving the random signal values by the receiver manager;
- measuring a transmission time corresponding to a time of transmission of the received random signal values and;
- comparing the transmission time to a predefined timing interval to detect perturbation attacks.

Advantageously, the embodiments of the invention provide a protection of digital circuits against perturbation attacks using a real-time detection and an accurate localization of perturbation attacks based on a partitioning of the attacked digital circuit.

The embodiments of the invention also exploit the sensitivity of the wires of the digital circuit to the perturbation attacks such as the sensitivity to the electromagnetic radiations to detect and localize perturbation attacks.

It is another advantage of the embodiments of the invention to provide a timing-based perturbation attacks detection approach that exploits the dependence between the transmission time required to transmit signals over the digital circuit and several parameters such as the length of the wires of the circuit, temperature, and the process corners, to make timing measurements which are used to detect and localize perturbation attacks performed on digital circuits.

BRIEF DESCRIPTION OF THE DRAWINGS

The accompanying drawings, which are incorporated in and constitute a part of this specification, illustrate various embodiments of the invention, together with the general description of the invention given above and the detailed description of the embodiments given below.

DETAILED DESCRIPTION

Embodiments of the invention provide devices and methods for securing digital circuits against perturbation attacks that attempt to induce/inject faults during the operability of the digital circuits.

The devices and methods according to the various embodiments of the invention provide real-time and accurate detection and localization of perturbation attacks performed on a digital circuit based on the use of timing measurements comprising measures of the time required to transmit random signal values over the wires (also referred to 'signal transmission lines') of the digital circuit.

The digital circuits may include various types of circuits implemented in industrial, information and/or consumer devices or systems used in a wide range of applications such as civil or military communication applications or data processing applications. The digital circuit may be implemented for example in:

a communication system (e.g. digital wired, wireless, cellular/radio, optical, satellite, acoustic, and molecular communication and transmission systems) to ensure a secure transfer of data over unsecure transmission channels;

a computing network/system to secure data center interconnections;

a digital data storage (e.g. cloud computing applications and cloud servers);

a recording (e.g. magnetic and optical recording);

a data processing system (e.g. databases, online sale systems, financial systems);

a positioning system;

digital television and video broadcasting;

an identity device (e.g. electronic passports, cryptographic identity documents);

a transportation and automotive device (e.g. autonomous car, connected car, inertial guidance system, GPS receiver, motor controller, electric and hybrid vehicle to ensure anti-theft protection);

a service provider system to provide restricted and authorized accesses;

a mobile phone device to authenticate the control and access to batteries and accessories;

a banking industry device to secure banking accounts and financial transactions;

a medical device to secure medical data and medical devices such as implantable medical devices which can be implanted within the body to treat a medical condition or to monitor the state of the functioning of some body parts (e.g. pacemakers, defibrillators to monitor and treat cardiac conditions, brain monitoring or stimulation devices such as neuro-stimulators for deep brain stimulation in cases such as epilepsy or Parkinson, drug delivery systems, biosensors);

in a Field Programmable Gate Array (FPGA), a hardware security module, or an electronic component carrying sensitive applications or data, which can be embedded for example in smart-cards or electrical vehicles.

Figure 1:
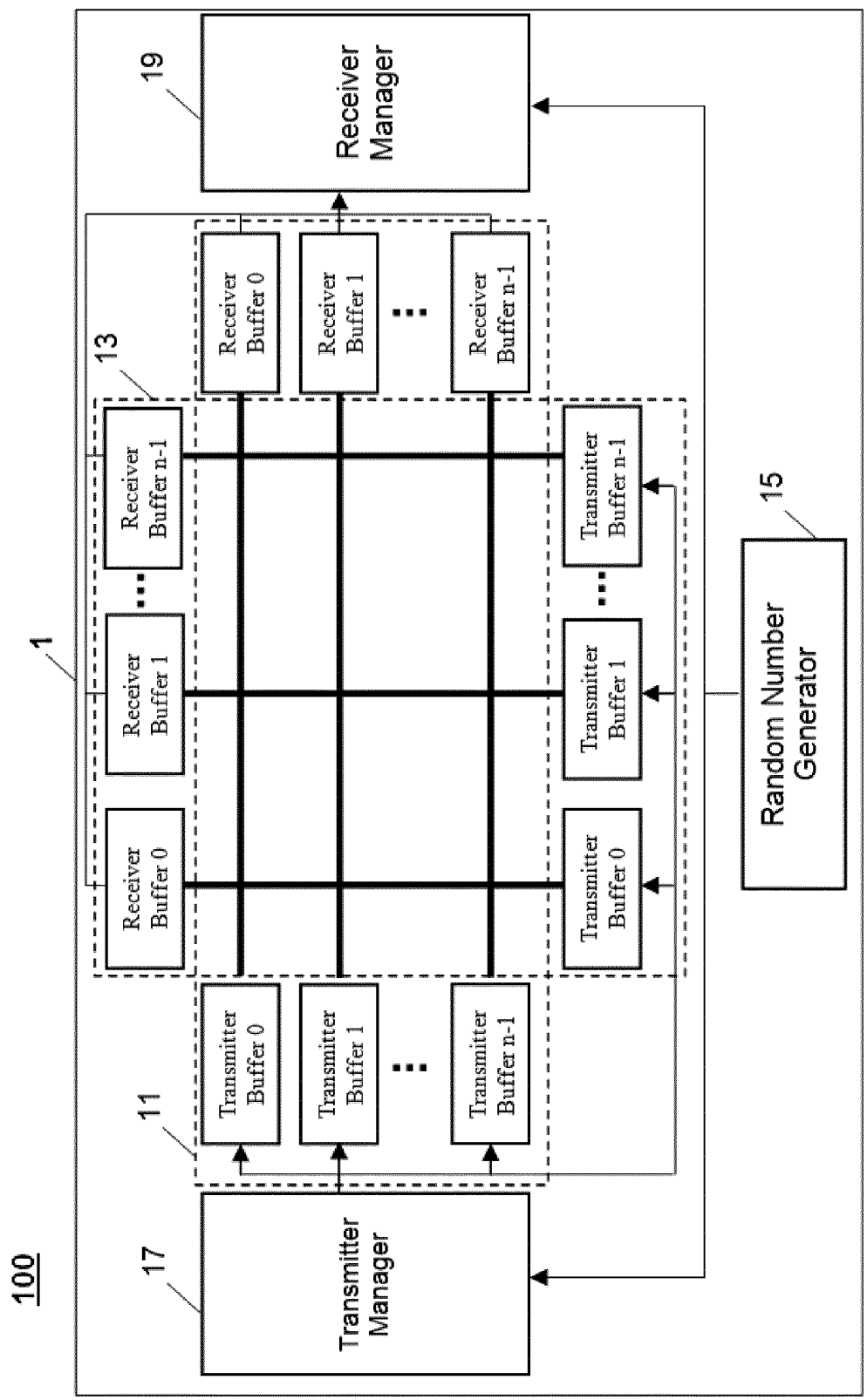
FIG. 1 is a diagrammatic view of a digital circuit and a device for detecting and localizing perturbation attacks performed on the digital circuit, according to some embodiments of the invention.

Referring to FIG. 1, there is shown an exemplary implementation of a digital circuit 1 (also referred to a 'secured digital circuit' or 'protected circuit') in a system 100.

The system 100 may be for example a communication system (e.g. digital, wired, wireless, cellular, optical, satellite, acoustic, and molecular communication system), a data processing system (e.g., online sale systems, financial systems, electronic passport systems, banking), a data storage system (e.g. databases), a recording system (e.g. magnetic and optical recording), or a positioning system, etc.

The digital circuit 1 may comprise logic gates printed on an integrated circuit (IC) that is a part of an integrated circuit device.

The integrated circuit device may be any device, computer, computing machine, or embedded system, programmed and/or programmable (e.g. a Field Programmable Gate Array circuit, an Application Specific Integrated Circuit, a system on chip, a Very-Large Scale Integration integrated circuit). Exemplary integrated circuit devices comprise, without limitations:

smart cards, tokens to store keys such as wallets, smart cards readers such as Automated Teller Machines (ATM) used for example in financial transactions, restricted accesses, telecommunications, military applications, secure communication equipments, or TV set-top boxes;

electrical and digital electronic devices such as RFID tags and electronic keys;

embedded secure elements;

computers (e.g. desktop computers and laptops), or tablets;

routers, switches, or printers;

mobile phones such as smart-phones, base stations, relay stations, or satellites;

Internet of Thing (IoT) devices, robots, drones; or recorders, multimedia players, mobile storage devices (e.g. memory cards and hard discs) with logon access monitored by cryptographic mechanisms.

In an application of the invention to a communication system, the integrated circuit device may be fixed or mobile, configured to operate in a wired, wireless, or optical fiber-based communication network.

Further, the integrated circuit device may be a standalone device or may be connected to external devices, machines or systems. The integrated circuit device may be implemented for example in a computer networking system (using for example one or more small or large area wired or wireless access networks).

According to some embodiments, the digital circuit 1 may be a system on chip that integrates on a single integrated circuit all the components of a computing machine or computer including a central processing unit, memory means, and input/output peripherals/ports.

The central processing unit is configured to execute the instructions of one or more programs stored in memory means using one or more processing units (referred to as 'processors') performing arithmetic, logical, control, and/or input/output operations specified by the instructions. The system on chip may be multi-processor comprising at least two processors or single-processor comprising one processor.

A processor may be multi-core, comprising a plurality of cores configured to perform tasks at a given time (as used for example in embedded systems, digital signal processing, or graphic processing units), thereby increasing the overall speed for program execution amenable to parallel computing. The different cores may be integrated onto a single integrated circuit die or onto multiple dies in a single chip package.

In some embodiments, a processor may include one or more of microprocessors, micro-controllers, digital signal processors, microcomputers, state machines, logic circuit, analog circuits, or any other devices that handle analog or digital signals according to the program instructions stored in memory means.

In some embodiments, memory means may comprise a main memory, processor cache memories, mass storage memories, and any other device/component capable of storing data/information. A memory mean may be volatile, non-volatile, or a combination of both volatile and non-volatile memory units.

A volatile memory may use one or more of a RAM, DRAM (e.g., DDR, SDRAM) SRAM, T-RAM, and Z-RAM. Volatile memories are generally advantageous in terms of improving read/write performance, with a lower cost/footprint than non-volatile writable memories.

A non-volatile memory may use one or more of a Mask ROM, PROM, EPROM, EEPROM, NVRAM, Flash memory Solid-state storage, nvSRAM, FeRAM (Ferro-electric RAM), MRAM (Magnetic RAM), PRAM. Non-volatile memories are generally advantageous in terms of providing access to previously stored information upon reboot and/or power cycle.

A mass storage memory may be for example a hard drive, an optical drive, or a tape drive.

According to some embodiments, the digital circuit 1 may be a part of a cryptographic digital circuit device configured to perform cryptographic mechanisms or algorithms involving the use, the generation and/or the storage of one or more cryptographic keys. The cryptographic mechanisms may be implemented to ensure security, authentication, protection, and/or privacy of data and/or signals stored on the digital circuit device or transferred over the system 100.

In such embodiments, the digital circuit 1 may comprise cryptographic processing or storage units configured to manipulate (for example generate, store, manage and/or use) cryptographic data and cryptographic keys. A cryptographic processing unit may be a secure crypto-processor dedicated for carrying out cryptographic operations to protect sensitive data in memory from hardware and/or software attacks. A crypto-processor may be configured to perform cryptographic mechanisms for encryption, integrity, and replay protection. Advantageously, memory encryption enables protecting the confidentiality of memory-resident data, integrity protection enables preventing an attacker from causing hidden modifications to the encrypted data stored in memory, and replay protection enables eliminating undetected temporal substitution of the encrypted data. Exemplary crypto-processors comprise smart-cards used for example in financial transactions, restricted access, telecommunication, military applications, secure communication equipments, Automated Teller machines, TV set-top boxes, etc.

The digital circuit 1 may be fed by a system clock located in the digital circuit device and configured to send out a clock signal on a regular basis to the digital circuit 1 and to other components of the digital circuit device. The system clock has a system clock period and frequency.

The digital circuit 1 may be fabricated using semi-conductor materials such as a semi-conductor wafer. During the fabrication process of the integrated circuit device, the wafer may be used as the substrate for the electronic components. The wafer may undergo several fabrication process steps such as doping, ion implantation, etching, and deposition of materials.

When integrated circuits are fabricated, a variation in the attributes of transistors (length, widths, oxide thickness) may naturally occur. Such variation is referred to as a 'process variation'.

The variation of fabrication parameters considered when applying an integrated circuit design to a semi-conductor wafer is referred to a 'process corner'. The process corners represent the extremes (extreme values) of the fabrication parameters within which the integrated circuit operates correctly. An integrated circuit fabricated at these process corners may operate slower or faster than specified and/or at lower or higher temperatures and/or voltages. However, if the integrated circuit does not function at any of these process corners, the integrated circuit design is considered to have inadequate design margin.

From a hardware point of view, the digital circuit 1 may comprise a metal wiring made of several wires (also referred to as 'interconnect wires' or 'signal transmission line') used to create electrical connections among the active components in order to transmit and distribute signals and power across the digital circuit 1. The performance and speed of the digital circuit 1 may depend on the interconnect structure, interconnect delay corresponding to the time needed by a signal to cross the entire wires, as well as on noise and power consumption.

The delay due to the interconnection between the wires, also known as 'the net delay' and the 'wire delay' is sensitive to the wires resistance (also referred to as 'net resistance') and capacitance (also referred to as 'net capacitance').

The net resistance may be derived from the wire resistivity, length, wide, and thickness. More specifically, the resistance of a wire is proportional to its length and inversely proportional to its cross-section.

The net capacitance is composed of two capacitances: a capacitance to ground and a capacitance to neighbors, i.e. the capacitance between neighboring wires occurring from the coupling with the other wires routed on the same metal layer or with the wires routed on the top or bottom metal layers.

Further, the net delay depends on the voltage applied to the digital circuit 1, on temperature, as well as on the fabrication process corners.

The net delay is not fixed. Variations of the net delay may thus reveal or indicate that an external perturbation has been performed on the digital circuit 1 trying to alter its functioning by inducing faults through a variation of temperature/voltage. For example, in case of an electromagnetic injection attack, an acceleration or a deceleration of the net delays of the signals transmitted over the wires of the digital circuit 1 may indicate that the digital circuit 1 is attacked by EM fault injections.

Embodiments of the invention exploit the sensitivity/dependence of the net delay to/on any variation on temperature/voltage/lengths of the wires to detect and localize, in real time perturbation attacks performed on the digital circuit 1. The real-time detection and localization of perturbation attacks is advantageously based on real-time timing measurements acquired to measure the time/delay needed to transmit and receive random signals over the wires of the digital circuit 1.

Referring to FIG. 1, there is shown a device for detecting and localizing perturbation attacks performed on the digital circuit 1, the device comprising a first metallic layer 11 and a second metallic layer 13 arranged on the digital circuit 1 such that the first metal layer 11 comprises a plurality of signal transmission lines routed horizontally and the second metal layer 13 comprises a plurality of signal transmission lines routed vertically, the device comprising one or more transmitter buffers and one or more receiver buffers, a transmitter buffer and a receiver buffer being connected by each signal transmission line. In other word, each signal transmission line of the first metallic layer 11 and the second metallic layer 13 connect a transmitter buffer to a receiver buffer. Each of the first layer 11 and the second layer 13 comprises n 2 (at least two) transmitter buffers and their corresponding at least two receiver buffers.

The detection of the perturbation attacks performed on the digital circuit 1 is based on the measure of the time required to transmit and receive signals over the signal transmission lines of the first metallic layer 11 and the second metallic layer 13. Accordingly, the device may further comprise a random number generator 15 (for example a true random number generator) configured to generate random signal values and to send the random signal values to a transmitter manager 17 and a receiver manager 19 that are comprised in the device. The transmitter manager 17 may be configured to transmit the random signal values generated and received from the random number generator 15 over the signal transmission lines of the first metallic layer 11 and the second metallic layer 13 such that the random signal values are transmitted by the transmitter buffers that connected to the transmitter manager 17 and are received by the receiver buffers that are connected to the receiver manager 19.

The receiver manager 19 may be configured to receive the random signal values transmitted over the various signal transmission lines of the first metallic layer 11 and the second metallic layer 13, to measure a transmission time corresponding to a time of transmission of the random signal values, and to detect and localize one or more perturbation attacks by comparing the measured transmission time to a predefined timing interval denoted by I.

In order to compute the exact transmission times of the signals through the signal transmission lines routed horizontally and vertically, the predefined timing interval may be previously determined by performing a set of simulations that are produced during the design phase of the digital circuit 1. The simulations for measuring/determining the timing interval may be produced/performed for different process corners including the best, the worst, and a typical process corner. Having the timing interval considering such process corners enables a correct computation/measurement of the transmission times needed to carry the signals through the different signal transmission lines in normal conditions during the running of the digital circuit 1.

The predefined timing interval I is defined by the number of system clock cycles needed to transmit the random signal values through each signal transmission line. The predefined timing interval $I=[t_0, t_1]$ may be represented by a first threshold denoted by $t_0$ corresponding to a minimum timing value and a second threshold $t_1$ corresponding to a maximum timing value. Using the simulations performed during the design phase to determine the timing interval, the first and second thresholds may be previously determined for all the process corners and depending on one or more parameters comprising the length of the signal transmission lines comprised in the first metallic layer 11 and the second metallic layer 13, temperature, voltage, and a load of a power supply charging the digital circuit 1. The first threshold and the second threshold determined for each process corner correspond respectively to the minimum and the maximum of the number of system clock cycles needed for a signal to be transmitted through the wires of the digital circuit 1.

The receiver manager 19 may be configured to store the timing interval previously determined to each process corner.

In normal conditions and during the running of the digital circuit 1, the timing interval may be used to detect any perturbation attacks. More specifically, the receiver manager 19 may be configured to detect a perturbation attack by comparing the transmission time measured and corresponding to the transmission of the generated random signal values over the different signal transmission lines of the first metallic layer 11 and the second metallic layer 13 to the first threshold $t_0$ and to the second threshold $t_1$ of the predefined timing interval I, the receiver manager 19 detecting a perturbation attack if the measured transmission time is lower than the first threshold $t_0$ or if the measured transmission time is higher than the second threshold $t_1$. A perturbation of the signals transmission over the different wires inducing a delayed or an accelerated arrival/reception of the random signal values by the receiver manager 19 indicates that the digital circuit 1 undergoes a perturbation attack.

According to some embodiments, the transmission of the random signal values over the signal transmission lines of the first metallic layer 11 and the second metallic layer 13 may be performed at each rising edge of the system clock. In such embodiments, the random number generator 15 may be configured to update the random signal values to be transmitted to the transmitter manager 17 and the receiver manager 19 at each rising edge of the system clock. Upon receiving the updated random signal values, the transmitter manager 17 may be configured to transmit the updated random signal values at the rising edge of the system clock over the signal transmission lines of the first metallic layer 11 and the second metallic layer 13. The receiver manager 19 may be configured to receive the updated random signal values during the rising edge of the system clock from the random number generator 15, to store the updated random signal values, and to initialize a counter at each rising edge of the system clock.

According to some embodiments in which the transmission time required for transmitting the random signal values is less than or equal to one system clock cycle, the receiver manager 19 may use an internal clock with a frequency higher than the frequency of the system clock to define the timing interval $I=[t_0, t_1]$ represented by a first threshold $t_0$ and a second threshold $t_1$ and defined, in such embodiments, by the number of internal clock cycles needed to transmit the random signal values through the signal transmission lines.

When using an internal clock cycle for measuring the signals transmission time, the receiver manager 19 may be configured, at each rising edge of the internal clock, to:
- increment the counter;
- compare the counter (previously initialized at the rising edge of the system clock) to the first threshold $t_0$ and the second threshold $t_1$;
- read the random signal values transmitted through the signal transmission lines;
- compare the random signal values transmitted through the signal transmission lines to the stored updated random signal values received from the random number generator at the rising edge of the system clock; and
- compare the random signal values transmitted through the signal transmission lines during the current system clock cycle to the random signal values transmitted through the signal transmission lines during the precedent system clock cycle.

The comparisons performed by the receiver manager 19 will enable a real-time detection of any perturbation attacks performed on the digital circuit 1. More specifically, the receiver manager 19 may be configured to detect a perturbation attack and to raise a security alarm:
- if the receiver manager 19 determines that the counter is equal to the second threshold $t_1$ and that the random signal values transmitted through the signal transmission lines are different from the updated random signal values stored during the rising edge of the system clock, this means that the signals were corrupted during transmission, or
- if the receiver manager 19 determines that the counter is lower than the first threshold $t_0$ and that the random signal values transmitted through the signal transmission lines during the current system clock cycle are different from the random signal values transmitted through the signal transmission lines during the precedent system clock cycle, this means that the signal values change before the minimum delay of the transmission computed during the design phase, and so the signals were accelerated due to an external manipulation, or
- if the receiver manager 19 determines that the counter is higher than the second threshold $t_1$ and that the random signal values transmitted through the signal transmission lines during the current system clock cycle are different from the random signal values transmitted through the signal transmission lines during the precedent system clock cycle, this means that the signal values change after the maximum delay of the transmission computed during the design phase, thus indicating that the signal values were slowed or perturbed after a correct transmission, or if the receiver manager 19 determines that the random signal values transmitted through the signal transmission lines change more than two times during one system clock cycle, this means that the values of the transmitted signals were changed many times during the transmission and that the digital circuit 1 is under an external manipulation.

According to some embodiments, a security alarm may be raised by the receiver manager 19 in order to trigger the execution of one or more security actions that enable the protection of the digital circuit against the detected perturbation attack(s). A security action may consist of a passive action (such as doing nothing) or an active action (corrective action) such as stopping (permanently or temporarily) the running of the digital circuit 1, rebooting or restarting one or more parts of the integrated circuit device to which belongs the digital circuit 1, deleting or regenerating secret values (e.g. cryptographic keys). The security action may depend on the localization of the detected perturbation attack and/or on the security strategy/policy adopted for specific parts/localizations of the digital circuit 1.

According to some embodiments, the security alarms raised upon the detection of one or more perturbation attacks may be displayed on a panel that is a part of the digital circuit 1 or of the integrated circuit device, output to an external device or system connected to the digital circuit 1, or stored for future retrieval by diagnostic tools or system monitor/manager/supervisor.

Figure 2:
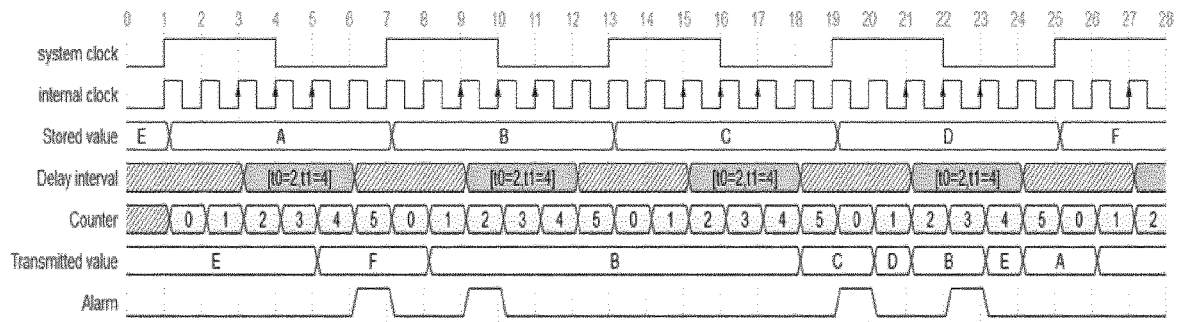
FIG. 2 shows temporal diagrams representing the detection of perturbation attacks, according to some embodiments of the invention.

FIG. 2 shows temporal diagrams illustrating the detection of an EM injection attack according to some embodiments in which the receiver manager 19 uses an internal clock cycle of a frequency that is 6 times the frequency of the system clock. A first diagram labeled 'system clock' represents the rising edges of the system clock considering four system clock cycles. A second diagram labeled 'internal clock' represents the rising edges of the internal clock. The diagram labeled 'stored value' designates the signal value generated by the random number generator at each rising edge of the system clock and sent to the transmitter manager 17 and the receiver manager 19, and stored by the receiver manager 19 during the rising edge of the system clock. Then the diagram labeled 'delay interval' refers to the timing interval $I=[t_0, t_1]$ required for the transmission of the signal value generated at each rising edge of the system clock by the random number generator. The diagram labeled 'counter' indicates the value of the counter initialized by the receiver manager at each rising edge of the system clock and incremented at each rising edge of the internal clock. The diagram labeled 'transmitted value' designates the value of the signal transmitted by the transmitter manager 17 over the signal transmission lines, and the diagram labeled 'Alarm' indicates in which conditions an alarm is raised by the receiver manager 19 depending on the comparisons performed at the receiver manager 19.

As shown in FIG. 2, four alarms are raised during the transmission of the values in this configuration:

a first alarm is raised, as the transmitted value, equal to 'F', received by the receiver manager 19 during the timing interval $I=[t_0=2, t_1=4]$, is different from the stored value, equal to 'A';

a second alarm is raised as the value of the counter (equal to '1') is lower than the first threshold (equal to $t_0=2$) and the transmitted signal value at the current system clock cycle (equal to 'B') is different from the transmitted signal value at the precedent system clock cycle (equal to 'F'). This means that the transmitted signal value is correct but was accelerated due to an external perturbation;

a third alarm is raised as the value of the counter (equal to '5') is higher than the second threshold (equal to $t_1=4$) when the signal value transmitted change (equal to 'C'). This indicates that the transmitted signal value is correct but was delayed due to an external perturbation;

a fourth alarm is raised as the transmitted value, at the current corresponding system clock cycle starting from t=19 to t=25, changes more than two times during the system clock cycle, first taking a value equal to 'C', then a value equal to D', and then a value equal to B'.

In one embodiment, the receiver manager 19 may be configured to determine localizations of one or more detected perturbation attacks using at least one signal transmission line routed horizontally and at least one signal transmission line routed vertically. As a fault injection will disturb at least one of the signal transmission lines that are routed horizontally and at least one of the signal transmission lines that are routed vertically, the horizontal and vertical routing of the signal transmission lines advantageously enables accurate localization of any perturbation attacks.

The embodiments of the invention advantageously enable real-time detection of EM fault injection attacks and can apply to the detection and localization of any perturbation attack such as a power glitch, a system clock tampering, a laser or light injection attack.

In some embodiments related to an application of the invention to secure cryptographic systems, the digital circuit 1 may be a cryptographic digital circuit comprising at least a sub-circuit configured to perform hardware and/or software cryptographic mechanisms chosen in a group comprising data and/or signal encryption and/or decryption, message authentication, and digital signatures, for ensuring data and/or signals security, authentication, and/or privacy.

Data and/or signal encryption and/or decryption may implement one or more of error correcting codes (for example Hamming codes, BCH codes), hash functions, and secret key-based encryption algorithms (using symmetric or asymmetric cryptographic keys).

A secret key-based encryption algorithm may be a symmetric encryption algorithm chosen in a group comprising DES (Data Encryption Standard), 3DES, AES (Advanced Encryption Standard), and RC4 (Rivest Cipher 4).

Alternatively, a secret key-based encryption algorithm may be an asymmetric encryption algorithm chosen in a group comprising RSA (Rivest-Shamir-Adleman) and ECDSA (Elliptic Curve Digital Signature Algorithm).

In some embodiments, the encryption and decryption algorithms may be chosen based on trade-offs between performance, memory, and the security level required by an application and/or a user.

The cryptographic keys may depend on one or more secret parameters such as a password or an external secret value for example shared between the integrated circuit device and one or more external devices or machines or users connected to the system 100 with the purpose of sharing the cryptographic keys.

In one embodiment, the cryptographic keys may be stored within the integrated circuit device, shared within the integrated circuit device, and/or shared with external devices, and/or shared with other systems (such as user systems).

The cryptographic key(s) may be destroyed on reboots and/or on shutdown of the integrated circuit device, and initialized (in a deterministic or random way) at the initialization of the integrated circuit device.

Figure 3:
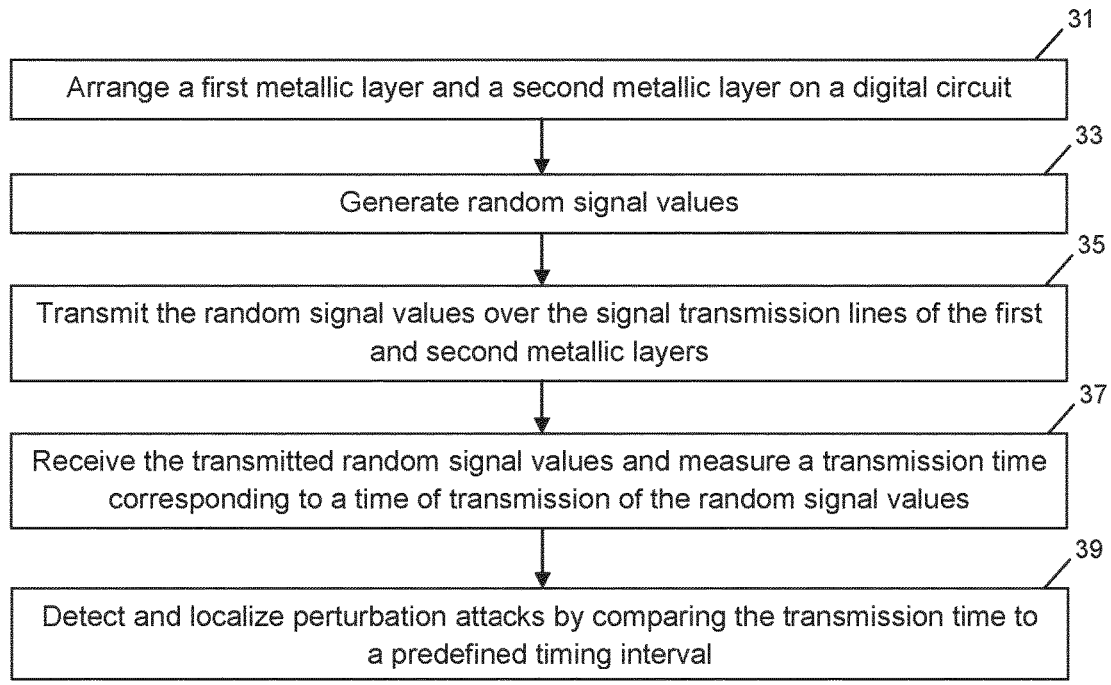
FIG. 3 is a flowchart illustrating a method for detecting and localizing perturbation attacks performed on a digital circuit, according to some embodiments of the invention.

Referring to FIG. 3, there is also shown a method for detecting and localizing perturbation attacks performed on a digital circuit 1.

In step 31, the digital circuit 1 may be partitioned into a first metallic layer and a second metallic layer such that the first metallic layer comprises a plurality of signal transmission lines routed horizontally and the second metallic layer comprises a plurality of signal transmission lines routed vertically. Each transmission line connects a transmitter buffer to a receiver buffer. The horizontal and vertical routing of the signal transmission lines enable the localization of perturbation attacks that are performed on the digital circuit 1.

The detection of perturbation attacks according to the method exploits real-time measurements of transmission times required to transmit and receive random signal values through the signal transmission lines of the first and the second metallic layer.

In step 33, random signal values may be generated using a random number generator. More specifically, the random signal values may be generated/updated at each rising edge of the system clock.

In step 35, the generated random signal values may be transmitted over the signal transmission lines of the first metallic layer and the second metallic layer, the random signal values being transmitted by transmitter buffers connected to a transmitter manager.

In step 37, the transmitted random signal values may be received by receiver buffers and the transmission time corresponding to the time of transmission of the random signal values may be measured. The transmission time measures the time required to transmit, by the transmit buffers, and receive, by the receiver buffers, the transmitted random signal values. The transmission time may be evaluated using the system clock cycles.

In step 39, one or more perturbation attacks may be detected and localized by comparing the measured transmission time to a predefined timing interval I.

According to some embodiments, the predefined timing interval I may be previously determined through a set of simulations performed during the design phase of the digital circuit 1, target of one or more perturbation attacks. The set of simulations may be performed to determine, for each of one or more process corners, the timing interval corresponding to the number of clock cycles required to carry signals through the signal transmission lines of the digital circuit 1.

According to some embodiments, the timing interval may depend on one or more parameters comprising the length of the signal transmission lines, temperature, voltage, and a load of the power supply charging the digital circuit 1.

The predefined timing interval $I=[t_0, t_1]$ may be represented by a first threshold denoted by $t_0$ corresponding to a minimum timing value and a second threshold $t_1$ corresponding to a maximum timing value. Using the simulations performed during the design phase to determine the timing interval, the first and second thresholds may be previously determined for one or more process corners.

The measurements performed during the design phase of the digital circuit 1 may be stored at storage means in the digital circuit 1 for usage, in normal conditions during the running of the digital device 1, in order to detect if a perturbation attacks is performed on the digital circuit 1. More specifically, the detection of perturbation attacks at step 39 may comprise comparing the transmission time measured and corresponding to the transmission of the generated random signal values over the different signal transmission lines of the first metallic layer and the second metallic layer to the first threshold $t_0$ and to the second threshold $t_1$ of the predefined timing interval I. A perturbation attack may be then detected if the measured transmission time is lower than the first threshold $t_0$ or if the measured transmission time is higher than the second threshold $t_1$.

According to some embodiments, the random signal values generated/updated at each system clock cycle may be stored at storage means comprised in a receiver manager that is connected to the receiver buffers. A counter may be initialized by the receiver manager at each rising edge of the system clock.

The stored random signal values may serve for comparison with the transmitted random signal values in order to determine if the received signals correspond to the generated signals and detect any delayed or advanced arrival/reception of the random signals. Such comparison may advantageously reveal that the digital circuit 1 undergoes an external manipulation/attack.

According to some embodiments in which the transmission time required for transmitting the random signal values is less than or equal to one system clock cycle, an internal clock with a frequency higher than the frequency of the system clock may be used at step 39 in order to define the timing interval $I=[t_0, t_1]$ represented by a first threshold $t_0$ and a second threshold $t_1$, the timing interval corresponding in such embodiments to the number of internal clock cycles needed to transmit the random signal values through the signal transmission lines.

In such embodiments, step 37 may further comprise, performing one or more of the following steps at each rising edge of the internal clock:
  incrementing the counter;
  comparing the counter to the first threshold $t_0$ and a second threshold $t_1$;
  reading the random signal values transmitted through the signal transmission lines and received at step 37;
  comparing the received random signal values to the stored random signal values updated at the rising edge of the current system clock cycle; and
  comparing the received random signal values that have been transmitted through the signal transmission lines during the current system clock cycle to the random signal values transmitted through the signal transmission lines during the precedent system clock cycle.

Depending on the comparisons results, one or more perturbation attacks may be detected in step 39:
  if it is determined in step 37 that the counter is equal to the second threshold $t_1$ and that the random signal values transmitted through the signal transmission lines are different from the updated random signal values stored during the rising edge of the system clock, this means that the signals were corrupted during transmission, or
  if it is determined in step 37 that the counter is lower than the first threshold $t_0$ and that the random signal values transmitted through the signal transmission lines during the current system clock cycle are different from the random signal values transmitted through the signal transmission lines during the precedent system clock cycle, this means that the signal values changed before the minimum delay of the transmission computed during the design phase, and accordingly that the signals were accelerated due to an external manipulation, or if it is determined in step 37 that the counter is higher than the second threshold $t_1$ and that the random signal values transmitted through the signal transmission lines during the current system clock cycle are different from the random signal values transmitted through the signal transmission lines during the precedent system clock cycle, this means that the signal values changed after the maximum delay of the transmission computed during the design phase, thereby indicating that the signal values were slowed or perturbed after a correct transmission, or if it is determined in step 37 that the random signal values transmitted through the signal transmission lines change more than two times during one system clock cycle, this means that the values of the transmitted signals changed many times during the transmission and that the digital circuit 1 is under an external manipulation.

Step 39 may further comprise raising a security alarm when one or more perturbation attacks are detected. A security alarm may be raised in order to execute one or more security actions that enable the protection of the digital circuit against the detected perturbation attack(s). For example, a security action may consist of a passive action (such as doing nothing) or an active action (corrective action) such as stopping (permanently or temporarily) the running of the digital circuit 1, rebooting or restarting one or more parts of the integrated circuit device to which belongs the digital circuit 1, deleting or regenerating secret values (e.g. cryptographic keys). The security action may depend on the localization of the detected perturbation attack and/or on the security strategy/policy adopted for specific parts/localizations of the digital circuit 1.

Further, the localization of the detected one or more perturbation attacks may be performed in step 39 using at least one signal transmission line that is routed horizontally within the first metallic layer and at least one signal transmission lines that is routed vertically within the second metallic layer.

The method for the detection and localization of perturbation attacks enables advantageously a real-time detection and a precise localization of fault injection attacks such as power glitch, system clock tampering attacks, laser/light injection attacks, and EM injection attacks.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such embodiments. Some of those embodiments may be advantageously combined, when appropriate. Additional advantages and modifications will readily appear to those skilled in the art. The invention in its broader aspects is therefore not limited to the specific details, representative methods, and illustrative examples shown and described.

The invention claimed is:

1. A device for detecting perturbation attacks performed on a digital circuit, wherein the device comprises:

a first metallic layer and a second metallic layer arranged on said digital circuit, said first metal layer comprising a plurality of signal transmission lines routed horizontally, said second metal layer comprising a plurality of signal transmission lines routed vertically, the device comprising one or more transmitter buffers and one or more receiver buffers, a transmitter buffer and a receiver buffer being connected by each signal transmission line;

a random number generator configured to generate random signal values;

the device further comprising a transmitter manager connected to one or more transmitter buffers and a receiver manager connected to one or more receiver buffers, wherein:

the transmitter manager is configured to transmit random signal values generated by said random number generator over the signal transmission lines of the first metallic layer and the second metallic layer, said random signal values being transmitted from said one or more transmitter buffers, connected to said transmitter manager, to said one or more receiver buffers connected to said receiver manager, and the receiver manager is configured to receive random signal values from the transmitter manager through said one or more receiver buffers connected to the receiver manager, measure a transmission time corresponding to a time of transmission of said received random signal values, and compare said transmission time to a predefined timing interval to detect perturbation attacks.

2. The device of claim 1, wherein the device is further configured to localize a detected perturbation attack from the comparison between said transmission time and said predefined timing interval.

3. The device of claim 1, wherein said predefined timing interval is related to the number of system clock cycles needed to transmit said random signal values through each signal transmission line.

4. The device of claim 3, said predefined timing interval is represented by a first threshold corresponding to a minimum timing value and a second threshold corresponding to a maximum timing value, said first and second thresholds being determined depending on one or more parameters in the group consisting of a length of the signal transmission lines comprised in the first metallic layer and in the second metallic layer, a temperature, a voltage, and a load of a power supply charging the digital circuit 1.

5. The device of claim 4, wherein said receiver manager is configured to compare the transmission time to said first threshold and to said second threshold, the receiver manager detecting a perturbation attack if the measured transmission time is lower than said first threshold or if the measured transmission time is higher than said second threshold.

6. The device of claim 5, wherein said receiver manager uses an internal clock with a frequency higher than the frequency of said system clock, a timing interval represented by a first threshold and a second threshold being defined by the number of internal clock cycles needed to transmit said random signal values through the signal transmission lines.

7. The device of claim 6, wherein said receiver manager is configured to raise an alarm:

if the counter is equal to said second threshold and the random signal values transmitted through said signal transmission lines are different from the updated random signal values stored during said rising edge of system clock, or if the counter is lower than said first threshold and the random signal values transmitted through said signal transmission lines during a current system clock cycle are different from the random signal values transmitted through the signal transmission lines during the preceding system clock cycle, or if the counter is higher than said second threshold and the random signal values transmitted through said signal transmission lines during a current system clock cycle are different from the random signal values transmitted through the signal transmission lines during the preceding system clock cycle, or if the random signal values transmitted through said signal transmission lines change more than two times during one system clock cycle.

8. The device of claim 1, wherein the random number generator is configured to update said random signal values at each rising edge of a system clock, the transmitter manager being configured to transmit updated random signal values at each rising edge of said system clock.

9. The device of claim 8, wherein said receiver manager is configured to:
   receive and store said updated random signal values during each rising edge of said system clock and to initialize a counter at each rising edge of said system clock;
   increment said counter at each rising edge of the internal clock;
   compare, at each clock cycle of said internal clock, the counter to said first threshold and said second threshold;
   read, at each rising edge of said internal clock, random signal values transmitted through the signal transmission lines;
   compare, at each rising edge of said internal clock, random signal values transmitted through signal transmission lines to stored updated random signal values; and
   compare, at each rising edge of said internal clock, random signal values transmitted through said signal transmission lines during a current system clock cycle to random signal values transmitted through the signal transmission lines during the precedent system clock cycle.

10. The device of claim 1, wherein said receiver manager is configured to determine localizations of one or more detected perturbation attacks using at least one signal transmission line routed horizontally and at least one signal transmission line routed vertically.

11. The device of claim 1, wherein said perturbation attack is one of a power glitch, a system clock tampering, a laser or light injection attack, or an electromagnetic injection attack.

12. The device of claim 1, wherein said digital circuit is a cryptographic digital circuit comprising at least a sub-circuit configured to perform one or more cryptographic operations chosen in a group comprising data and/or signal encryption and/or decryption, message authentication, and digital signatures.

13. The device of claim 12, wherein data and/or signal encryption and/or decryption implements one or more of error correcting codes, hash functions, and secret key-based encryption algorithms.

14. The device of claim 13, wherein a secret key-based encryption algorithm is a symmetric encryption algorithm chosen in a group comprising DES (Data Encryption Standard), 3DES, AES (Advanced Encryption Standard), and RC4 (Rivest Cipher 4), and a secret key-based encryption algorithm is an asymmetric encryption algorithm chosen in a group comprising RSA (Rivest-Shamir-Adleman) and ECDSA (Elliptic Curve Digital Signature Algorithm).

15. A method for detecting perturbation attacks performed on a digital circuit, wherein the method comprises:
   arranging a first metallic layer and a second metallic layer on said digital circuit, said first metallic layer comprising a plurality of signal transmission lines routed horizontally, said second metallic layer comprising a plurality of signal transmission lines routed vertically, each signal transmission line connecting a transmitter buffer to a receiver buffer;
   generating random signal values;
   transmitting, by a transmitter manager, the random signal values over the signal transmission lines of the first metallic layer and the second metallic layer, said random signal values being transmitted from one or more transmitter buffers connected to said transmitter manager, to one or more receiver buffers connected to a receiver manager;
   receiving said random signal values by said receiver manager;
   measuring a transmission time corresponding to a time of transmission of said received random signal values and;
   comparing said transmission time to a predefined timing interval to detect perturbation attacks.

* * * * *